(12) United States Patent
Nakamura et al.

(10) Patent No.: US 11,567,205 B2
(45) Date of Patent: Jan. 31, 2023

(54) OBJECT MONITORING SYSTEM INCLUDING DISTANCE MEASURING DEVICE

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 599 days.

(21) Appl. No.: 16/665,166

(22) Filed: Oct. 28, 2019

(65) Prior Publication Data
US 2020/0200908 A1 Jun. 25, 2020

(30) Foreign Application Priority Data
Dec. 19, 2018 (JP) .............................. JP2018-237734

(51) Int. Cl.
*G01S 17/89* (2020.01)
*G01S 7/48* (2006.01)
*G01S 17/08* (2006.01)
*G01S 7/4865* (2020.01)
*G01S 7/497* (2006.01)

(52) U.S. Cl.
CPC ............ *G01S 17/89* (2013.01); *G01S 7/4865* (2013.01); *G01S 17/08* (2013.01); *G01S 7/497* (2013.01)

(58) Field of Classification Search
CPC ........ G01S 17/89; G01S 7/4865; G01S 17/08; G01S 7/497; G01S 7/4817; G01S 17/894; H04N 7/18; H04N 5/2353
See application file for complete search history.

(56) References Cited

U.S. PATENT DOCUMENTS

| | | | |
|---|---|---|---|
| 2015/0109414 A1* | 4/2015 | Adam | H04N 13/296 348/46 |
| 2016/0075313 A1* | 3/2016 | Moriizumi | B60T 8/321 701/93 |
| 2017/0242126 A1* | 8/2017 | Matsuo | G01S 17/894 |
| 2020/0096637 A1* | 3/2020 | Ulrich | G01S 17/36 |
| 2020/0186751 A1* | 6/2020 | Tran | H04N 5/247 |
| 2021/0088636 A1* | 3/2021 | Xu | G01S 7/4911 |

FOREIGN PATENT DOCUMENTS

| | | |
|---|---|---|
| JP | 2007122507 A | 5/2007 |
| JP | 2015-513825 A | 5/2015 |
| JP | 2017-181488 A | 10/2017 |
| WO | 2016075885 A1 | 5/2016 |

* cited by examiner

*Primary Examiner* — Tuyen K Vo
(74) *Attorney, Agent, or Firm* — Hauptman Ham, LLP

(57) ABSTRACT

An object monitoring system includes a distance measuring device which generates, while repeating an imaging cycle having different imaging modes, a distance image of a target space for each of the imaging modes, and a computing device which determines presence or absence of an object within a monitoring area set in the target space based on the distance image.

8 Claims, 12 Drawing Sheets

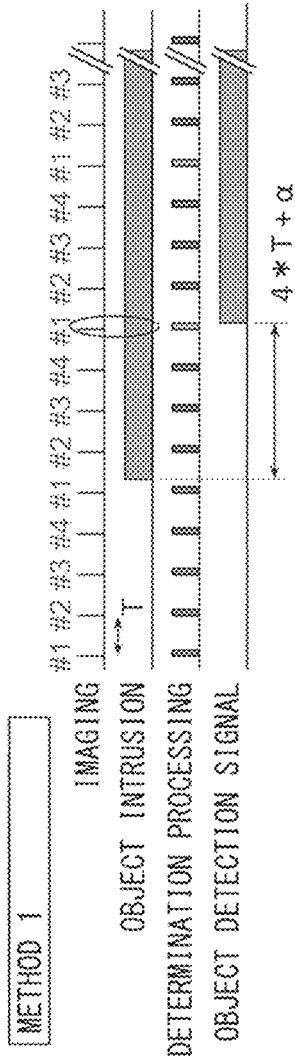
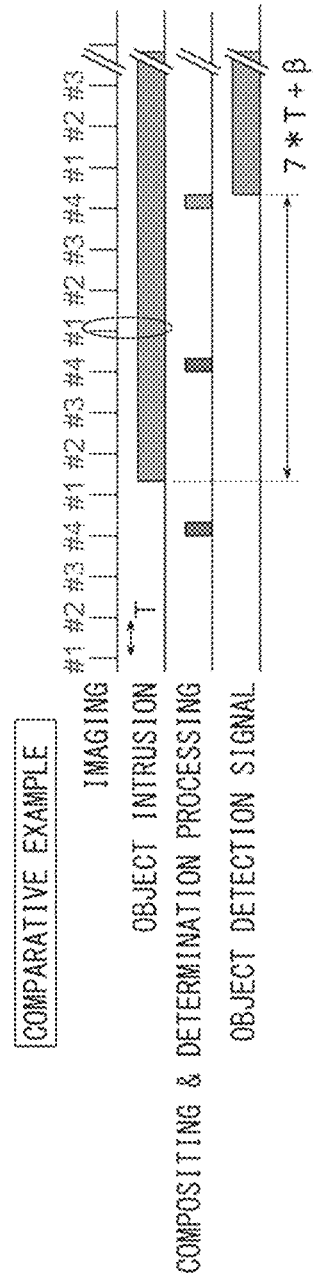

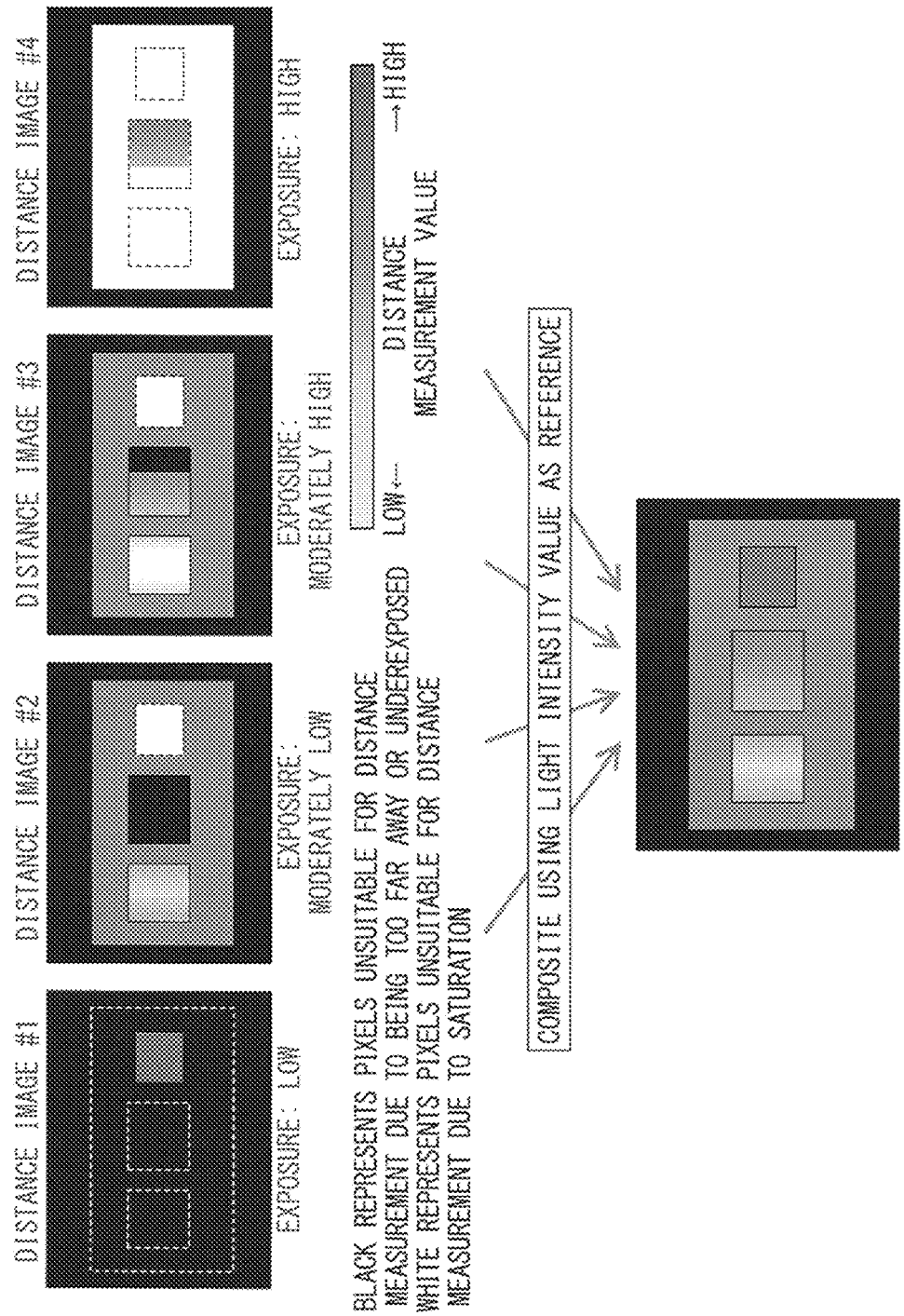

OBJECT MONITORING SYSTEM INCLUDING DISTANCE MEASURING DEVICE

RELATED APPLICATIONS

The present application claims priority of Japanese Application Number 2018-237734, filed Dec. 19, 2018, the disclosure of which is hereby incorporated by reference herein in its entirety.

BACKGROUND OF THE INVENTION

1. Field of the Invention

The present invention relates to an object monitoring system including a distance measuring device, and in particular, relates to an object monitoring system which can solve various problems during multi-imaging.

2. Description of Related Art

TOF (time of flight) cameras which output distance based on the time of flight of light as distance measuring devices which measure the distance to an object are known. Many TOF cameras use a phase difference method in which a target space is irradiated with reference light which has been intensity-modulated over predetermined cycles, and the distance measurement value of the target space is output based on a phase difference between the reference light and the light reflected from the target space.

In conventional TOF cameras, objects having specific reflectance (for example, white materials, black materials, retroreflective materials, etc.) cannot be imaged in a single image within a desired measurement distance range due to insufficient dynamic range of the image sensor. In order to alleviate such problems, there are means for capturing multiple images while changing the amount of reference light, the exposure time, the aperture value, or combinations thereof (hereinafter referred to as imaging modes). As shown in, for example, FIG. 10, the necessary dynamic range can be satisfied by capturing multiple images by setting four types of imaging modes including a low exposure imaging mode #1, a moderately low exposure imaging mode #2, a moderately high exposure imaging mode #3, and a high exposure imaging mode #4.

When multiple images are captured with different imaging modes, the TOF camera outputs multiple distance images. When a white cylinder, a black triangular prism, and a retroreflective plate are arranged in front of a background plate and imaged with four imaging modes, as shown in, for example, FIG. 11, four distance images #1 to #4 are generated, as shown in FIG. 12. In these distance images, black represents pixels which are unsuitable for distance measurement due to being too far away or being underexposed, white represents pixels which are unsuitable for distance measurement due to saturation, and gray represents pixel for which distance measurement is possible. Note that the white and black dashed imaginary lines in the drawings have been added to represent the positions of the objects. Light gray represents a low distance measurement value, and represents pixels showing a close object, and dark gray represents a high distance measurement value, and represents pixels showing a distant object. It can be understood that in the low exposure distance image #1, distance measurement can be performed for only the retroreflective plate, and in the high exposure distance image #4, distance measurement can be performed for only the dark portion of the black triangular prism. The desired distance image can be obtained by compositing these four distance images. As such a multi-imaging technology, Japanese Unexamined Patent Publication (Kokai) No. 2017-181488 is publicly known. As an object detection technology using TOF cameras, Japanese Unexamined PCT Patent Publication (Kohyo) No. 2015-513825 is publicly known.

Japanese Unexamined Patent Publication (Kokai) No. 2017-181488 describes extracting pixels representing a comparatively high received light intensity between a plurality of distance images acquired with different imaging conditions based on received light intensity associated with each pixel in the distance images, and using the extracted pixels in a composite distance image of the plurality of distance images.

Japanese Unexamined PCT Patent Publication (Kohyo) No. 2015-513825 describes appropriately setting the exposure time of a TOF camera to acquire a distance image, and detecting an object within a detection area based on the detection distance image.

SUMMARY OF THE INVENTION

In an object monitoring system which detects objects within a monitoring area based on a distance image using a distance measuring device such as a TOF camera, the following problems occur when a plurality of distance images acquired with a plurality of imaging modes are composited based on received light intensity.

The case in which the TOF camera 61 captures an image twice with double exposure difference when an object 60 having a low reflectivity moves quickly from left to right relative to the background as shown in, for example, FIG. 13 will be considered. At this time, as shown in FIG. 13B, in imaging mode #1, in which the exposure is high, the received light intensity of the background is 1000, and the received light intensity of the low reflectance object is 400, and in imaging mode #2, in which the exposure is low, the received light intensity of the background is 500. When the received light intensity of the low reflectance object of 400 in imaging mode #1 and the received light intensity of 500 in the same position in imaging mode #2 are compared with each other, the two distance images are composited using the distance measurement values of the pixels of imaging mode #2, in which the received light intensity is greater. Thus, the object will not be present in the composite distance image. In other words, in the case in which an n-times exposure difference is used and an object having a reflectance less than 1/n moves quickly relative to the background, there is a problem in that the object may not be present in the composite distance image.

Conversely, in an object monitoring system used as a safety device, the detection of objects as early as possible is desired. However, since presence or absence of objects cannot be determined with such a distance image composite method unless a plurality of images are captured, there is also a problem in that object detection is slow. Likewise, in a method of generating a composite distance image by referencing the received light intensity of each pixel in a plurality of distance images acquired in different imaging modes and comparing the received light intensities, the processing load is significant, which is one cause of delay of object detection.

A technology which solves the various problems during multi-imaging has been demanded.

An aspect of the present disclosure provides an object monitoring system, comprising a distance measuring device which generates, while repeating an imaging cycle having different imaging modes, a distance image of a target space for each of the imaging modes, and a computing device which determines presence or absence of an object within a monitoring area set in the target space based on the distance image, wherein the computing device determines the presence or absence of the object within the monitoring area based on determination results as to whether or not a distance measurement value of each pixel in the distance image is valid and whether or not the distance measurement value is within the monitoring area each time the distance image is generated for each imaging mode.

BRIEF DESCRIPTION OF THE DRAWINGS

FIG. 6A is a timing chart showing the results of method 1.

FIG. 6B is a timing chart of a comparative example.

FIG. 12 is a conceptual view showing a plurality of distance images of subjects acquired with different imaging modes, and a composite distance image in which these distance images are composited.

DETAILED DESCRIPTION

Figure 1:
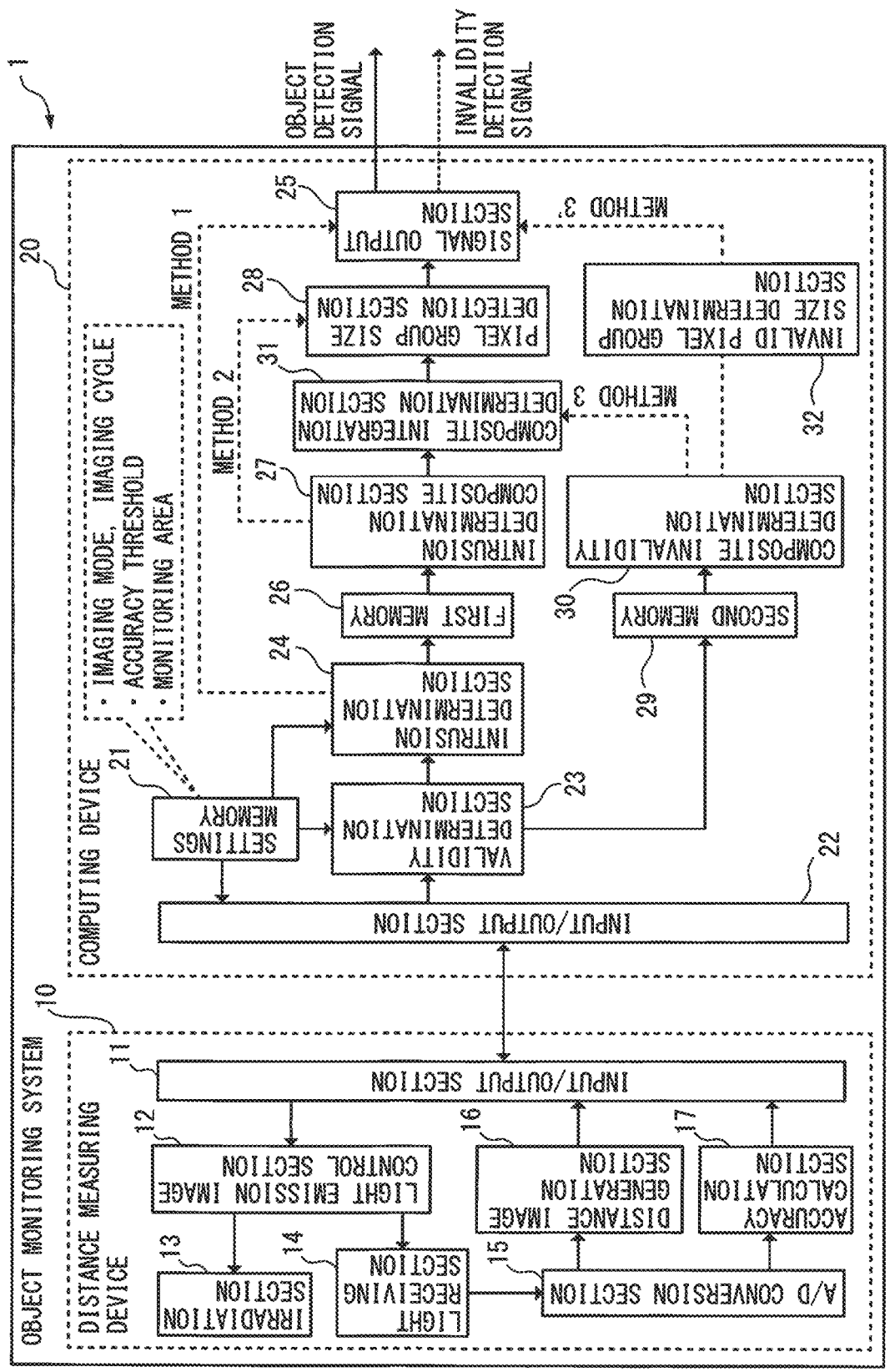
FIG. 1 is a block diagram of an object monitoring system which executes three object determination methods.

The embodiments of the present disclosure will be described in detail below with reference to the attached drawings. In the drawings, identical or similar constituent elements have been assigned the same or similar reference signs. Furthermore, the embodiments described below do not limit the technical scope of the inventions or the definitions of the terms described in the claims.

Three object determination methods which can solve the various problems during multi-imaging will be described with reference to FIG. 1. FIG. 1 is a block diagram of an object monitoring system which executes the three object determination methods (methods 1 to 3). Below, the structures of the object monitoring systems in methods 1 to 3 will be described in order.

<Method 1>

The object monitoring system 1 comprises a distance measuring device 10 and a computing device 20. The distance measuring device 10 and the computing device 20 can be communicably connected to each other via a wired or wireless network, or can be integrally configured by means of bus connections or the like.

The distance measuring device 10 is constituted by a TOF camera, a laser scanner, or the like, and sequentially generates distance images for each imaging mode while repeating an imaging cycling having different imaging modes. The distance measuring device 10 comprises an input/output section 11, a light emission and imaging control section 12, an irradiation section 13, a light receiving section 14, an A/D conversion section 15, and a distance image generation section 16.

The input/output section 11 inputs setting values of the imaging modes, the imaging cycle, etc., from the computing device 20 into the distance measuring device 10, and sequentially outputs distance images generated for each imaging mode from the distance measuring device 10 to the computing device 20. In an alternative embodiment, the setting values of the imaging modes, the imaging cycle, etc., may be input to the distance measuring device 10 side, and output to the computing device 20 side.

The imaging modes are composed of the luminescence of the reference light, the exposure time, the aperture value, or combinations thereof. For example, the imaging modes may be set such as imaging mode #1: high luminescence and low exposure, imaging mode #2: high luminescence and moderate exposure, and imaging mode #3: high luminescence and high exposure, depending on external factors such as the reflectance of the subject and external light.

The imaging cycle is a single cycle including a plurality of imaging modes, and may be set using only different imaging modes such as #1→#2→#3, or may be set so as to include the same imaging mode such as #1→#1→#2→#4. In the former, the imaging cycle is repeated such as #1→#2→#3→#1→#2→#3, etc., and in the latter, the imaging cycle is repeated such as #1→#1→#2→#4→#1→#1→#2→#4.

The light emission and imaging control section 12 controls the emission of the irradiation section 13 and the imaging of the light receiving section 14 based on the imaging modes and the imaging cycle. The irradiation section 13 comprises a light source which emits intensity-modulated reference light and a scanning mechanism, such as a diffusion plate or MEMS mirror, which irradiates the target space with the reference light. The light receiving section 14 comprises a condenser lens which condenses the light reflected from the target space, an optical filter which transmits only reference light having a specific wavelength, and a light-receiving element which receives the reflected light. The light receiving section 14 repeats light reception at four exposure timings shifted in phase by, for example, 0°, 90°, 180°, and 270° with respect to the light emission timing of the reference light, and charge amounts $Q_1$ to $Q_4$ are accumulated for each phase.

The A/D conversion section 15 amplifies and A/D-converts the charge amounts Q1 to Q4 accumulated in the light receiving section 14. At this time, in the case of saturation or insufficient exposure, a singular value (e.g., saturation: 9999 or insufficient exposure: 9998) representing the insufficiency of the distance measurement is output in place of the A/D converted value. The distance image generation section 16 determines the phase difference between the reference light and the reflected light based on the A/D converted values of the charges amounts Q1 to Q4, calculates the distance measurement values from the phase difference, and generates a distance image. An example of the formulas for calculating the phase difference Td and the distance measurement value L are shown below. In the following formulas, c is the speed of light, and f is the modulation frequency of the reference light. Note that in the case of insufficient distance measurement, a distance image including the singular value in place of the distance measurement value is generated.

$$Td = \arctan\left(\frac{Q_2 - Q_4}{Q_1 - Q_3}\right) \quad \text{[Formula 1]}$$

$$L = \frac{c}{4\pi f} Td \quad \text{[Formula 2]}$$

The distance measuring device 10 of the present example may further comprise an accuracy calculation section 17. The accuracy calculation section 17 calculates the accuracy of the distance measurement value based on the relationships of the charge amounts Q1 to Q4 for each pixel within the distance image, and sequentially generates accuracy images corresponding to the distance images. Examples of formulas for calculating the accuracy P are shown below. In the formulas below, D is the difference between the sum of the charges amounts Q1 and Q3 and the sum of the charge amounts Q2 and Q4, I is the received light intensity, h is a correction factor used for conversion to a percentage, and e is other errors which can be expected from structural errors of the distance measuring device 10, component characteristics, temperature characteristics, aging, and environmental conditions. In an ideal environment with no errors, the difference D from the phase relationships of the four exposure timings is zero. Thus, the accuracy P of the distance measurement value can be calculated by adjusting the scale of the difference D in accordance with the received light intensity I, converting to a percentage with the correction factor h, and adding the other errors e. Note that the other errors e can be experimentally determined using an actual machine.

$$D = |(Q_1 + Q_3) - (Q_2 + Q_4)| \quad \text{[Formula 3]}$$

$$I = \frac{\sqrt{(Q_1 - Q_3)^2 + (Q_2 - Q_4)^2}}{2} \quad \text{[Formula 4]}$$

$$P = h\frac{D}{I} + e \quad \text{[Formula 5]}$$

In addition to distance images generated for each imaging mode, the input/output section 11 may sequentially output accuracy images, corresponding to the distance images, from the distance measuring device 10 to the computing device 20.

The computing device 20 may be configured as a CPU (central processing section), RAM (random access memory), an ASIC (application specific integrated circuit), FPGA (field-programmable gate array), or the like, and determines the presence or absence of the object within the monitoring area set within the target space based on the distance image. The computing device 20 comprises a settings memory 21, an input/output section 22, a validity determination section 23, an intrusion determination section 24, and a signal output section 25.

The settings memory 21 stores set values such as the preset imaging modes, the imaging cycle, the accuracy threshold of the distance measurement value, and the monitoring area set in advance by the user. The accuracy threshold may be set uniformly for the distance measurement values of each pixel within the distance image (e.g., ±2.2%), or a plurality of accuracy thresholds may be set for the pixels of specified areas within the distance image (e.g., area A: ±2.1%, area B: ±3.3%, etc.). The monitoring area is set in the target space of the distance measuring device 10 as a three-dimensional position relative to the distance measuring device 10, and the monitoring area may be converted to and stored as a distance range table (pixel A: 1.2 m to 2.3 m, pixel B: 1.4 m to 2.4 m, etc.) of the monitoring area in which each pixel within the distance image is viewed.

The input/output section 22 outputs the set values of the imaging modes, the imaging cycle, etc., from the computing device 20 to the distance measuring device 10, and sequentially inputs the distance images generated for each imaging mode and, as necessary, the accuracy images corresponding to the distance images, from the distance measuring device 10 to the computing device 20.

The validity determination section 23 determines whether or not the distance measurement values of each pixel within the distance image are valid. Validity of the distance measurement values means that the distance measuring device 10 is capable of measuring distance (i.e., not a singular value), or that the distance measurement values are within the accuracy threshold (and not a singular value). In the case of the latter, it is determined whether or not the distance measurement value is valid by comparing the accuracy of each pixel within the accuracy image with the accuracy threshold. In an alternative embodiment, the distance measuring device 10 may output information regarding the charge amounts Q1 to Q4 to the computing device 20, and the validity determination section 23 may calculate the accuracy of the distance measurement value of each pixel in the same manner as the accuracy calculation section 17 described above.

The intrusion determination section 24 determines whether or not the valid distance measurement values of each pixel within the distance image are within the monitoring area. Specifically, it is determined whether or not the valid distance measurement values of each pixel are within the monitoring area with reference to the distance range table of the monitoring area. In Method 1, when the determination results indicate that even a single pixel is genuine, the intrusion determination section 24 directly acts on the signal output section 25 to output an object detection signal. The object detection signal is used, for example, as a signal for cutting the power of a source of danger, such as a robot or machine tool isolated from the operator, in consideration of safety of the operator entering the monitoring area.

Figure 2:
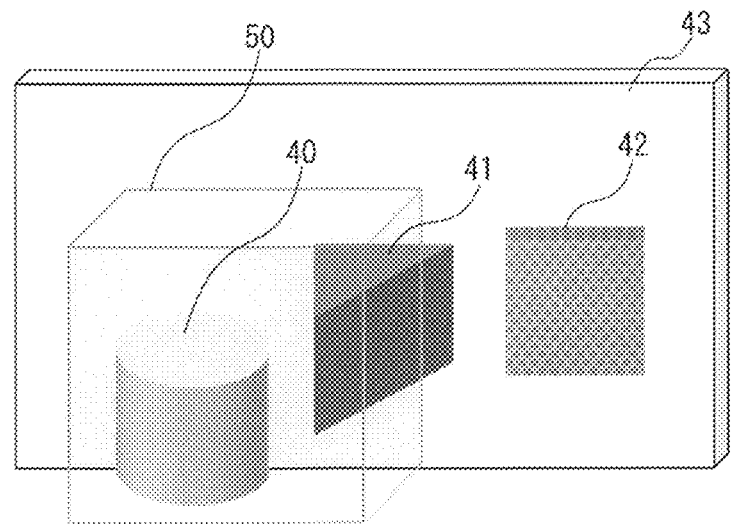
FIG. 2 is a perspective view showing objects having specific reflectances.
Figure 3:
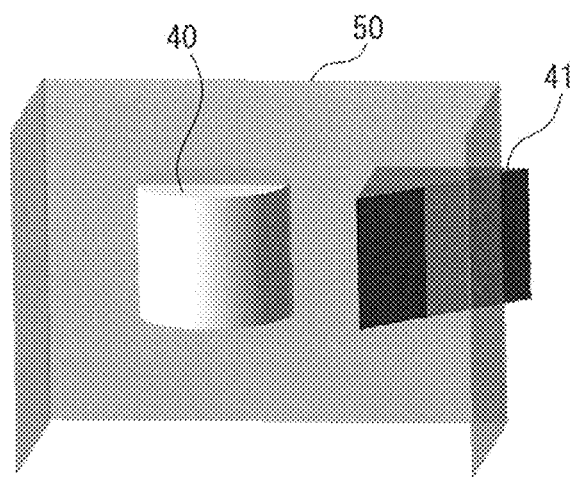
FIG. 3 is a perspective view showing an object which has entered into a monitoring area.

An example of Method 1 will be described. In the present example, the case in which the monitoring area 50 is determined within the target space of the distance measuring device as shown in FIG. 2, and in which a part of the white cylinder 40 and a part of the black triangular prism 41, among the objects (the white cylinder 40, the black triangular prism 41, and the retroreflective plate 42 arranged in front of the background plate 43) having specific reflective characteristics, have entered the monitoring area 50 as shown in FIG. 3 will be assumed. Note that white materials, black materials, and retroreflective materials are representative examples of objects having various reflection characteristics generally corresponding to the materials of the hair, and body, and uniform of an operator, and these materials are used for checking the necessary dynamic range as a distance measuring device.

Figure 4:
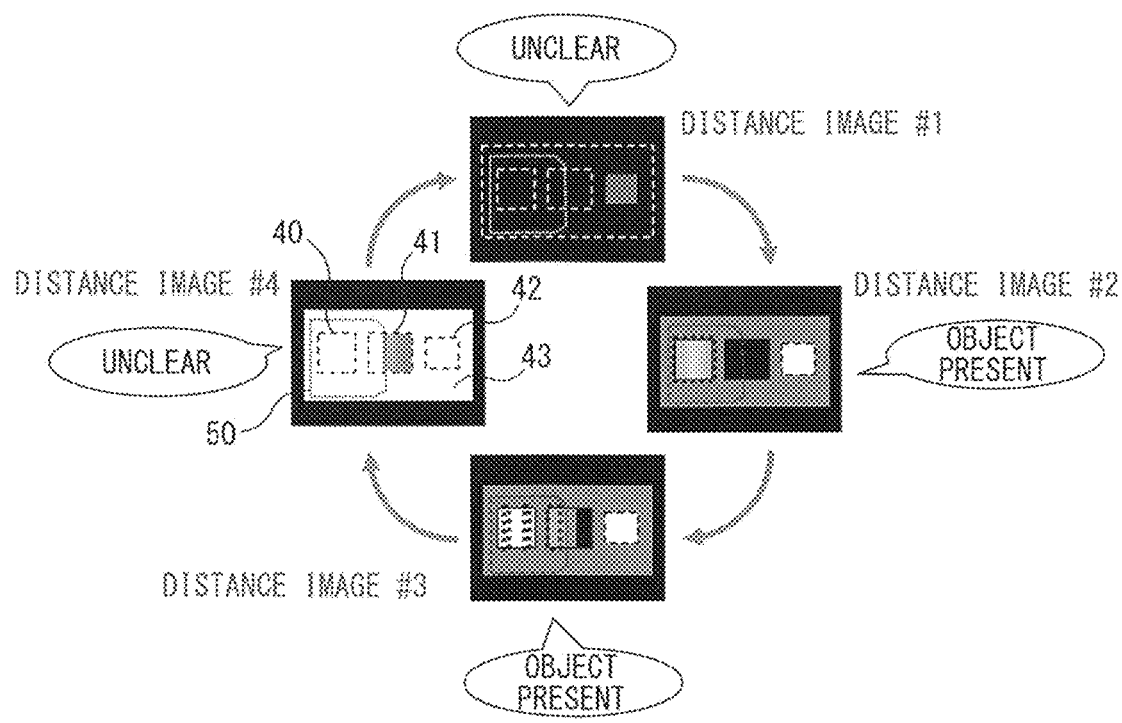
FIG. 4 is a conceptual drawing showing object determination according to method 1.
Figure 5:
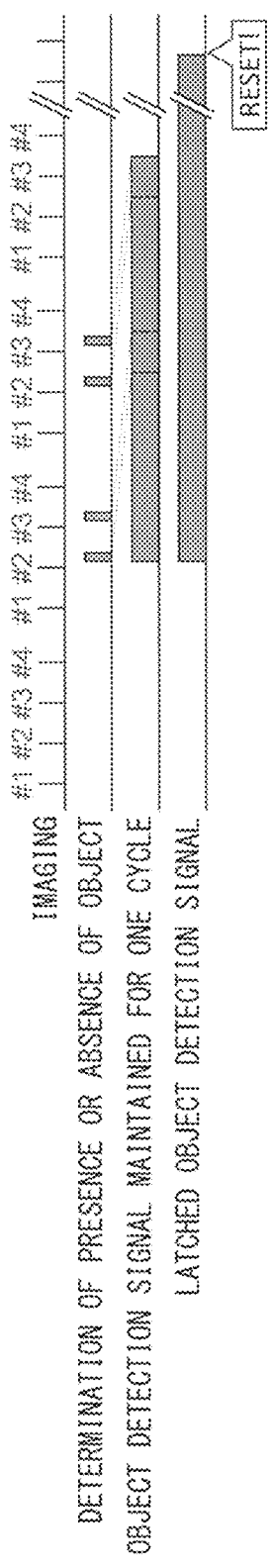
FIG. 5 is a timing change showing an example of object detection signals according to method 1.

As shown in FIG. 4, the distance measuring device generates distance images #1 to #4 while repeating the imaging cycle including the four imaging modes #1 to #4. In distance image #1, in which the exposure is low, though only the distance measurement value of the retroreflective plate 42 is valid, since the distance measurement value of the retroreflective plate 42 is not within the monitoring area 50, the presence or absence of the object within the monitoring area 50 is unclear at the time point at which distance image #1 is generated. Since the distance measurement values of the white cylinder 40 and the background plate 43 are valid in distance image #2, in which the exposure is moderately low, and since the distance measurement value of the white cylinder 40 is within the monitoring area 50, an object detection signal is output at the time point at which the distance image #2 is generated.

In distance image #3, in which the exposure is moderately high, since the distance measurement values of part of the white cylinder 40, part of the black triangular prism 41, and the background plate 43 are valid, and the distance measurement value of the white cylinder 40 and the distance measurement value of the black triangular prism 41 are within the monitoring area 50, an object detection signal is output at the time point at which the distance image #3 is generated. In distance image #4, in which the exposure is high, the distance measurement value of only part of the black triangular prism 41 is valid, but since the distance measurement value of the black triangular prism 41 is not within the monitoring area 50, the presence or absence of the object within the monitoring area at the time point at which the distance image #4 is generated is unclear.

In method 1, an object detection signal is output at the time point at which distance image #2 or distance image #3 is generated. Thus, method 1 can prevent object misdetection as compared with the conventional case in which an object is detected from a composite distance image generated based on received light intensity.

However, since the presence or absence of the object within the monitoring area is unclear at the time points at which distance images #1 and #4 are generated, a function for maintaining the object detection signal for 1 cycle or more or a function for latching the object detection signal until the user resets is conventionally added.

FIG. 6A is a timing chart showing the results of method 1, and FIG. 6B is a timing chart of a comparative example in which determination processing is carried out after a composite process image is generated. As a worst-case response time, the case in which an object for which the distance measurement value is only valid in imaging mode #1 enters the monitoring area immediately after imaging mode #1 will be assumed.

In method 1, in order to perform determination processing for each imaging mode, the object detection signal is output at a response time of $4 \times T + \alpha$ (T is the time interval of the imaging modes). Conversely, in the comparative example, since determination processing is performed after the composite distance image has been generated, the object is detected in the composite distance image after two cycles. In other words, in the comparative example, the object detection signal is output at a response time of $7 \times T + \beta$. Thus, method 1 can detect the object approximately $3 \times T$ times more quickly as compared with the comparative example. In other words, according to the object determination of method 1, the worst-case response time is faster. Since the monitoring area set around the source of danger, such as the robot or machine tool, is determined in consideration of movement speed of the operator, when the response speed is slow, it is necessary that the monitoring area be set wider. However, since the response speed is fast in Method 1, the monitoring area can be set smaller, and design of the layout of the equipment and the monitoring area can easily be performed. The worst-case response time is one of the important features of an object monitoring system, and by increasing the response speed, a safe and highly convenient object monitoring system can be provided.

<Method 2>

Referring again to FIG. 1, the structure of the object monitoring system of method 2 will be described. In method 2, the computing device 20 further comprises a first memory 26, an intrusion determination composite section 27, and a pixel group size detection section 28. The first memory 26 stores determination results (e.g., black: 1: object is present in monitoring area; white: 0: otherwise) as to whether or not the valid distance measurement value of each pixel within the distance image is within the monitoring area as an intrusion determination image every time a distance image is generated for each imaging mode.

The intrusion determination composite section 27 generates a composite intrusion determination image by performing logical OR operation of a prescribed number of intrusion determination images. Though the prescribed number is equal to the number of the plurality of types of imaging modes which ensure the necessary dynamic range, the prescribed number is not limited thereto. The prescribed number may be, for example, four in the case in which an imaging cycle including tree imaging modes #1, #2, and #4 is carried out as #1→#1→#2→#4, or may be the imaging mode number for two cycles or three cycles (e.g., 8 or 12). In general, every time an intrusion determination image is generated, a composite intrusion determination image is generated (or updated) using a prescribed number of intrusion determination images starting from the latest intrusion determination image. However, it should be noted that the generation (or update) timing and the starting point of the intrusion determination image are not limited.

Every time a distance image is generated for each imaging mode, the pixel group size detection section 28 determines whether or not the size of the pixel group representing the presence of the object within the monitoring area in the image is equal to or greater than a standard pixel group size from the composite intrusion determination image. According to this determination method, variations in the distance measurement values of the distance images of the distance measuring device and false detections due to unnecessary small objects such as dust or mist can be reduced, whereby stable object determination can be achieved. An n×n (n is an integer) pixel area is commonly used as the standard pixel group size, and it is confirmed whether or not there are any pixels indicating that the object is present in any standard pixel group size area within the composite intrusion determination image. When it is determined that there is a pixel area having a standard pixel group size indicating the presence of the object from the composite intrusion determination image, the pixel group size detection section 28 outputs an object detection signal using the signal output section 25. Though the illustrated n×n standard pixel group size is a square, a rectangular n×m (m is an integer different from n) size may be used, a shape close to a circle excluding pixels at the corners of the square or rectangle may be used, and any shape can be used as the standard pixel group size as long as it is an aggregate of adjacent pixels. In general, the size and shape of the standard pixel group size are closely related to the size and shape of objects which can be detected as an object monitoring system, and thus, are determined after consideration thereof.

Figure 7:
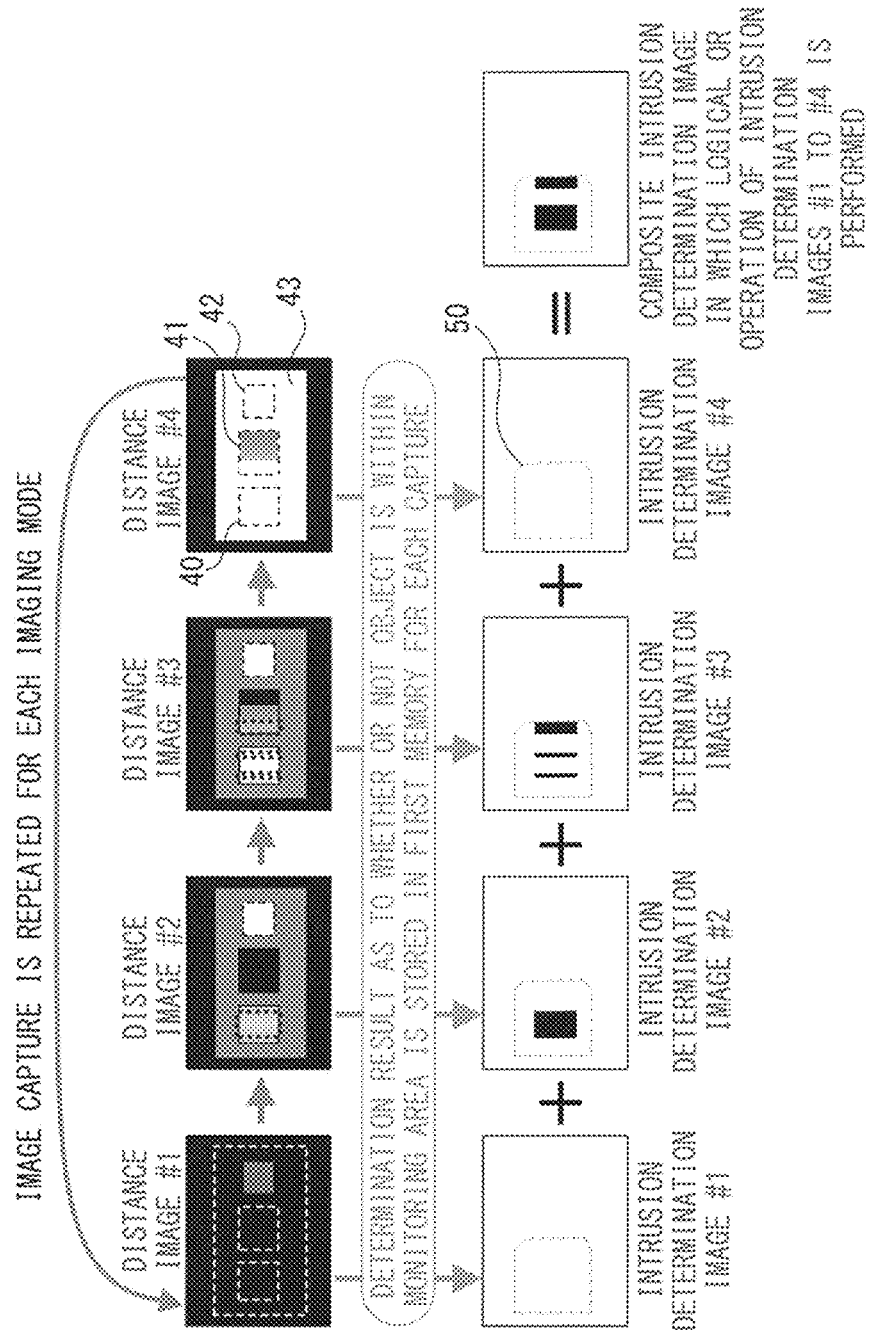
FIG. 7 is a conceptual view showing object determination according to method 2.

An example of method 2 will be described. In the present example, as in method 1, the case in which a part of the white cylinder 40 and a part of the black triangular prism 41, among the objects having specific reflectances, have entered into the monitoring area 50, as shown in FIG. 3, will be assumed. At this time, a distance measuring device as shown in FIG. 7 generates distance images #1 to #4 and the corresponding intrusion determination images #1 to #4 while repeating an imaging cycle having four imaging modes #1 to #4. In intrusion determination image #1, in which the exposure is low, the distance measurement value for only the retroreflective plate 42 is valid, but since the distance measurement value of the retroreflective plate 42 is not within the monitoring area 50, there are no intrusion pixels (black: 1). In intrusion determination image 2, in which the exposure is moderately low, since the distance measurement values of the white cylinder 40 and the background plate 43 are valid and the distance monitoring value of the white cylinder 40 is within the monitoring area 50, there is an intrusion pixel (black: 1).

In intrusion determination image #3, in which the exposure is moderately high, since the distance measurement values of a part of the white cylinder 40, a part of the black triangular prism 41, and the background plate 43 are valid and the distance measurement value of the white cylinder 40 and the distance measurement value of the black triangular prism 41 are within the monitoring area 50, there is an intrusion pixel (black: 1). In intrusion determination image #4, in which the exposure is high, only the distance measurement value of a part of the black triangular prism 41 is valid, but since the distance measurement value of the black triangular prism 41 is not within the monitoring area 50, there are no intrusion pixels (black: 1). When logical OR operation of these intrusion determination images #1 to #4 is performed to generate a composite intrusion determination image, the size of the object which has entered the monitoring area can be confirmed.

Figure 8:
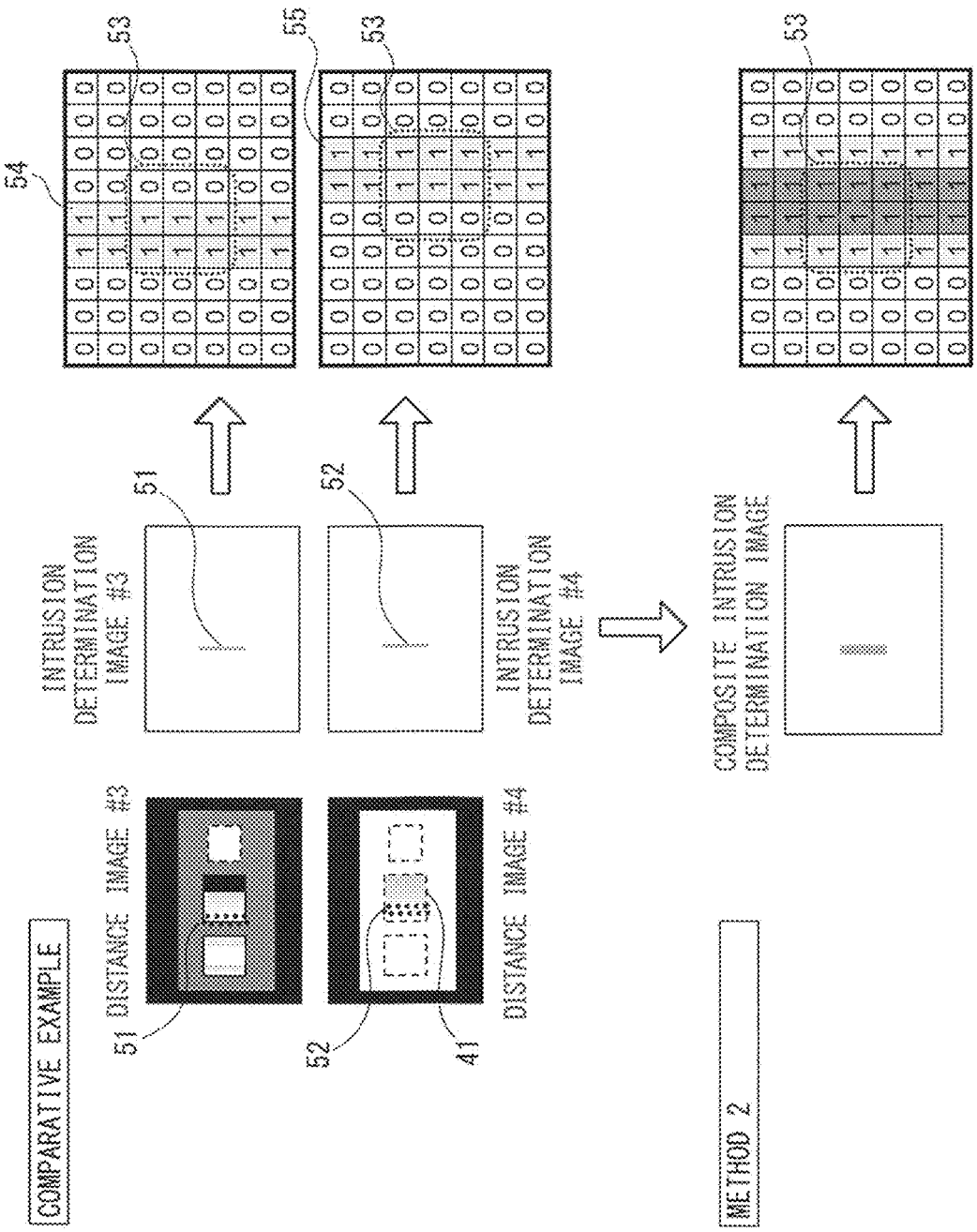
FIG. 8 is a conceptual view showing the results of method 2 and a comparative example.

FIG. 8 is a conceptual diagram showing the results of method 2 and a comparative example. The case in which a part of the black triangular prism 41 has entered the monitoring area, and the intrusion areas 51, 52 of the black triangular prism 41 are divided between the two intrusion determination images #3 and #4 will be assumed. At this time, the intrusion areas 51, 52 are constituted by 2×7 pixel areas 54, 55, and the standard group size is a 3×3 pixel area 53. At the time points at which distance images #3 and #4 are generated, though a standard pixel group size cannot be detected from intrusion determination images #3 and #4, since a composite intrusion determination image in which logical OR operation of the intrusion determination images #3 and #4 is performed is generated in accordance with the object detection of method 2, the size of the object which has entered the monitoring area can be confirmed. In other words, since a standard pixel group size (3×3 pixel area 53) can be detected from the composite intrusion determination image, failure to detect intrusion objects can be prevented even when the intrusion object is divided between the intrusion determination images of a plurality of imaging modes.

<Method 3>

Referring again to FIG. 1, the structure of the object monitoring system 1 of method 3 will be described. In method 3, the computing device 20 further comprises a second memory 29, a composite invalidity determination section 30, and a composite integration determination section 31. The second memory stores determination results (e.g., black: 1: invalid distance measurement pixel; and white: 0: valid distance measurement pixel) as to whether or not the distance measurement values of each pixel within the distance images are invalid each time a distance image is generated for each imaging mode as an invalidity determination image.

The composite invalidity determination section 30 generates a composite invalidity determination image by performing logical AND operation of a prescribed number of invalidity determination images. Since the prescribed number and the composite image of the invalidity determination images are identical to those described with regard to method 2, an explanation thereof has been omitted.

The composite integration determination section 31 generates an integrated composite determination image by performing logical OR operation of the composite intrusion determination image and the composite invalidity determination image. Each time a distance image is generated for each imaging mode, the pixel group size detection section 28 detects a standard pixel group size from the integrated composite determination image. Since the standard pixel group size is identical to that described with regard to method 2, an explanation thereof has been omitted. When a standard pixel group size is detected from the integrated composite determination image, the pixel group size detection section 28 outputs an object detection signal by operating the signal output section 25.

Figure 9:
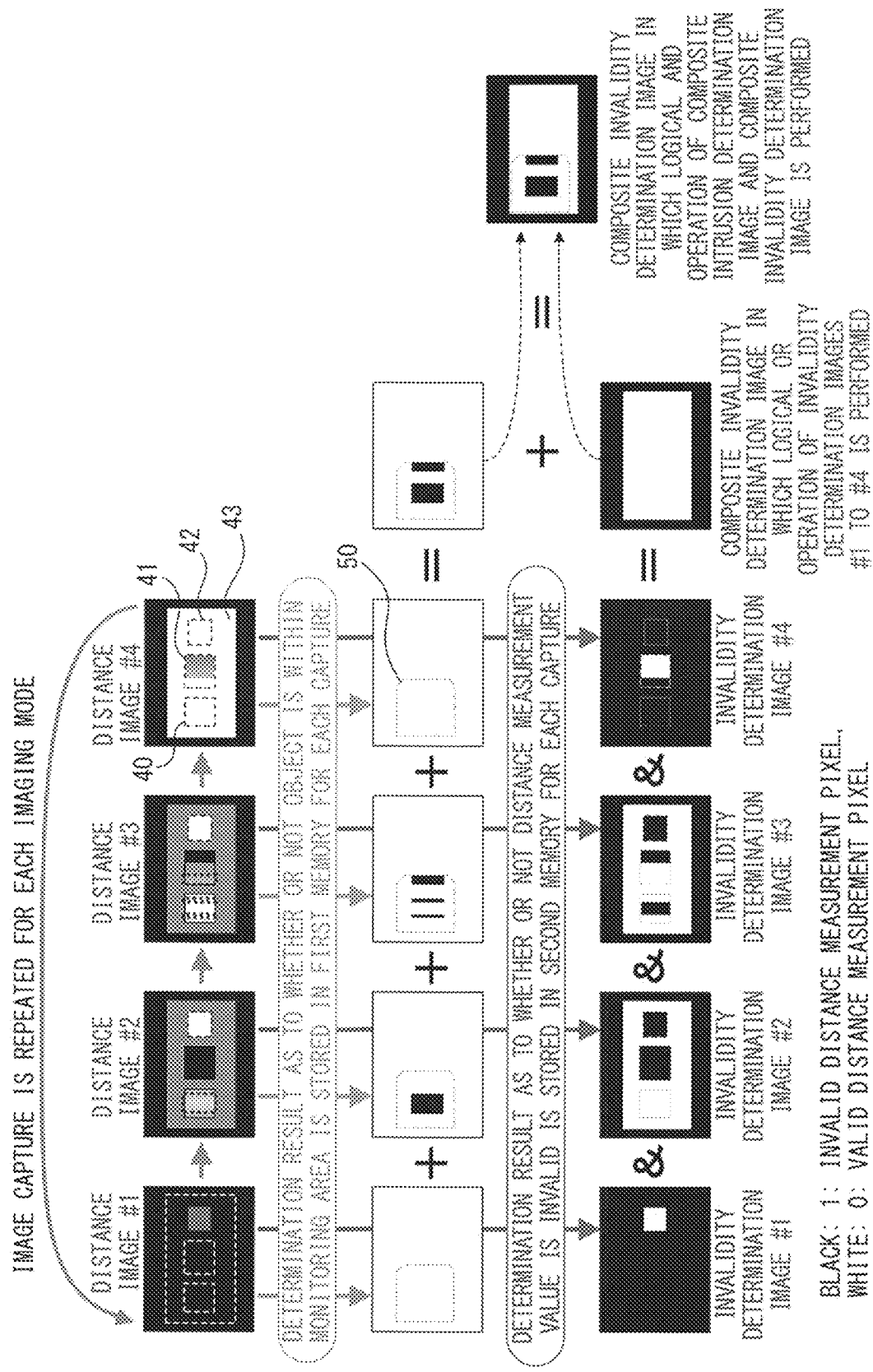
FIG. 9 is a conceptual view showing object determination according to method 3.
Figure 10:
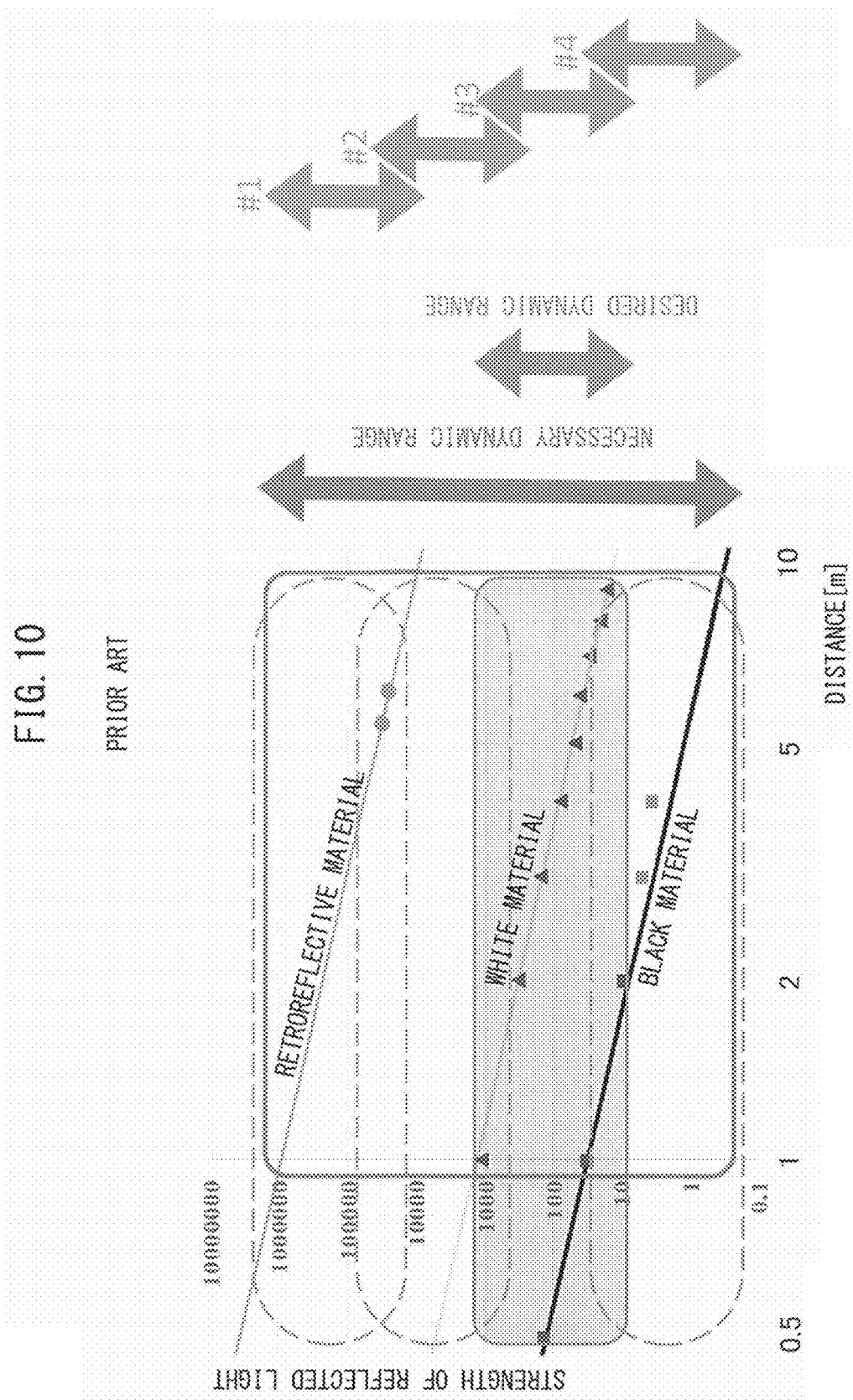
FIG. 10 is a conceptual view showing four imaging modes.
Figure 11:
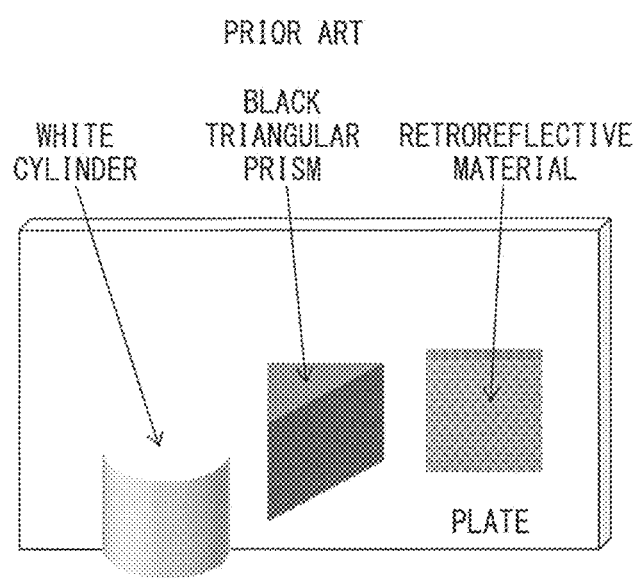
FIG. 11 is a perspective view showing objects having specific reflectances.
Figure 13A:
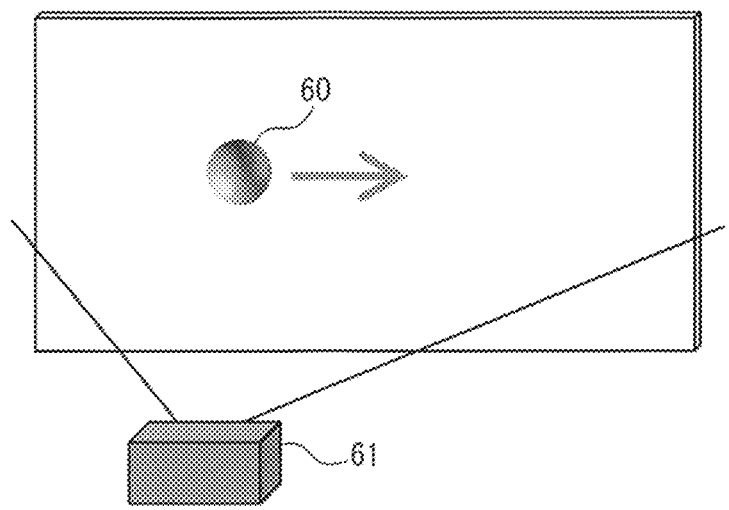
FIG. 13A is a perspective view showing a TOF camera capturing an image of a state in which a low reflectance object is moving from left to right at a high speed with respect to the background.
Figure 13B:
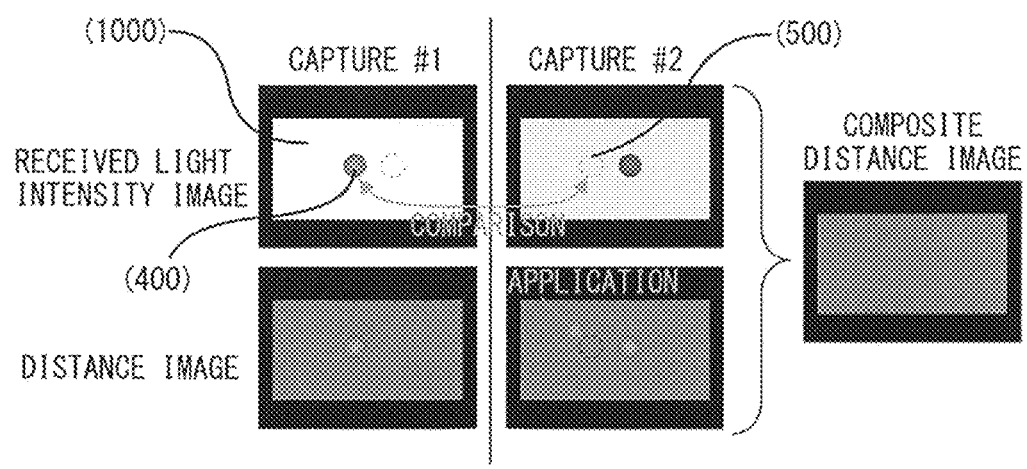
FIG. 13B is a conceptual view showing received light intensity images and distance images acquired with different imaging modes in which the exposure time differ by a factor of two.

An example of method 3 will be described. As in method 1, in the present example, the case in which a part of the white cylinder 40 and a part of the black triangular 41, among the objects having specific reflectance, have entered the monitoring area 50 as shown in FIG. 3 will be assumed. At this time, the distance measuring device shown in FIG. 9 generates the distance images #1 to #4, the corresponding intrusion determination images #1 to #4, and the corresponding invalidity determination images #1 to #4 while repeating the imaging cycle including the four imaging modes #1 to #4. In invalidity determination image #1, in which the exposure is low, there is an invalid distance measurement pixel (black: 1) in an area other than the retroreflective plate 42. In the invalidity determination image #2, in which the exposure is moderately low, there is an invalid distance measurement pixel (black: 1) in an area other than the white cylinder 40 and the background plate 43.

In invalidity determination image #3, in which the exposure is moderately high, there are invalid distance measurement pixels (black: 1) in areas other than part of the white cylinder 40, part of the black triangular prism 41, and the background plate 43. In invalidity determination image #4, in which the exposure is high, there are invalid distance measurement pixels (black: 1) in areas other than part of the black triangular prism 41. When a composite invalidity determination image is generated by performing logical AND operation of the invalidity determination images #1 to #4, the original invalid distance measurement pixel can be confirmed.

The results of method 3 will be described. Generally, when a pixel constituting the monitoring area is distance measurement invalid, the object monitoring system 1 functions as a safety device and outputs an object detection signal as if an object were present (i.e., performs a failsafe). However, since multiple images are captured in order to ensure a desired dynamic range, in some cases many invalid distance measurement pixels may naturally be included in each distance image acquired for each imaging mode. Thus, if an object detection signal is output as a result of invalid distance measurement pixels constituting the monitoring area, the possibility of erroneous detection is high, and the desired failsafe effect cannot be achieved. According to the object determination of Method 3, since a composite invalidity determination image is generating by AND-ing a number of invalidity determination images equal to the number of imaging modes in order to ensure the desired dynamic range, invalid distance measurement pixels in the composite invalidity determination image indicate pixels for which the distance measurement value has never become valid after a complete image cycle, and as a result, it is possible to identify the original invalid measurement pixel in the monitoring area. Further, since an integrated composite determination image is generated by performing logical OR operation of the composite intrusion determination image and the composite invalidity determination image, e.g., even in the case in which a portion of the uniform of an operator has reflective characteristics within the range specified in the specification of the object monitoring system and a part having reflective characteristics which are outside of the specified ranged, and these portions are divided between the composite intrusion determination image and the composite invalidity determination image, a standard pixel group size can be detected as a single object (uniform). In other words, even if the object intrusion status and the distance measurement invalidity status within the monitoring area are correctly detected and a distance measurement invalidity occurs, by assuming that there is an object, it is possible to control a source of danger, such as a robot or a machine tool, within a safe range using only a single object detection signal.

<Method 3'>

Referring again to FIG. 3, method 3', which is a modified example of method 3, will be described. In method 3', the computing device 20 further comprises an invalid pixel group size determination section 32. The invalid pixel group size determination section 32 determines from the composite invalidity determination image whether or not the size of the pixel group representing distance measurement invalidity in the image has a standard invalid pixel group size (for example, 1 pixel or a 2×2 pixel area). When it is determined that the pixel area has a standard invalid pixel group size, the invalid pixel group size determination section 32 outputs the invalidity detection signal by operating the signal output section 25. Though the standard invalid pixel group size can be assumed as any shape, as in the standard pixel group size described above, by making the size thereof smaller than the standard pixel group size, it is possible to indicate that distance measurement invalidity has been detected even if object detection for the monitoring area has not been achieved. As a result, the user of the object monitoring system can implement countermeasures, such as elimination of the cause of distance measurement invalidity.

The constituent elements of the aforementioned computing device 20 may be realized as programs executed by a CPU or the like. Such programs can be provided recorded on a computer-readable non-transitory recording medium such as a CD-ROM.

Though various embodiments have been described in the present description, the present invention is not limited to the embodiments described above. It can be recognized that various modifications can be made within the scope of the following claims.

The invention claimed is:

1. An object monitoring system, comprising
a distance measuring device configured to generate, while repeating an imaging cycle having different imaging modes, a distance image of a target space for each of the imaging modes, and
a computing device configured to determine presence or absence of an object within a monitoring area set in the target space based on the distance image,
wherein the computing device is configured to determine the presence or absence of the object within the monitoring area based on determination results as to
whether or not a distance measurement value of each pixel in the distance image is valid, and
whether or not the distance measurement value is within the monitoring area each time the distance image is generated for each of the imaging modes, and
wherein the distance measurement value being valid means that the distance measurement value is not a singular value relating to saturation and/or insufficient exposure.

2. The object monitoring system according to claim 1, wherein the computing device is configured to determine that the object is within the monitoring area when the determination results indicate that even a single pixel is genuine.

3. The object monitoring system according to claim 1, wherein the computing device is configured to store the determination results as intrusion determination images, and determine presence or absence of the object within the monitoring area based on a composite intrusion determination image in which a prescribed number of the intrusion determination images are composited.

4. The object monitoring system according to claim 3, wherein the computing device is further configured to
store determination results as to whether or not the distance measurement value of each pixel in the distance image is invalid as invalidity determination images, and
determine distance measurement invalidity within the monitoring area based on a composite invalidity determination image in which a prescribed number of the invalidity determination images are composited.

5. The object monitoring system according to claim 3, wherein the prescribed number is the number of the imaging modes.

6. An object monitoring system, comprising a distance measuring device which generates, while repeating an imaging cycle having different imaging modes, a distance image of a target space for each of the imaging modes, and a computing device which determines presence or absence of an object within a monitoring area set in the target space based on the distance image, wherein
the computing device determines the presence or absence of the object within the monitoring area based on determination results as to whether or not a distance measurement value of each pixel in the distance image is valid and whether or not the distance measurement value is within the monitoring area each time the distance image is generated for each imaging mode, and
wherein the computing device stores the determination results as intrusion determination images, generates a composite intrusion determination image in which a prescribed number of the intrusion determination images are composited, stores determination results as to whether or not the distance measurement value of each pixel in the distance image is invalid as invalidity determination images, generates a composite invalidity determination image in which a prescribed number of the invalidity determination images are composited, and determines the presence or absence of the object within the monitoring area based on an integrated composite determination image in which the composite intrusion determination image and the composite invalidity determination image are composited.

7. The object monitoring system according to claim 6, wherein the computing device determines that the object is within the monitoring area when a prescribed pixel group size is detected from the composite intrusion determination image or the integrated composite determination image.

8. An object monitoring system, comprising a distance measuring device which generates, while repeating an imaging cycle having different imaging modes, a distance image of a target space for each of the imaging modes, and a computing device which determines presence or absence of an object within a monitoring area set in the target space based on the distance image, wherein the computing device determines the presence or absence of the object within the monitoring area based on determination results as to whether or not a distance measurement value of each pixel in the distance image is valid and whether or not the distance measurement value is within the monitoring area each time the distance image is generated for each imaging mode, the computing device stores the determination results as intrusion determination images, and determines presence or absence of the object within the monitoring area based on a composite intrusion determination image in which a prescribed number of the intrusion determination images are composited, the computing device further stores determination results as to whether or not the distance measurement value of each pixel in the distance image is invalid as invalidity determination images, and determines distance measurement invalidity within the monitoring area based on a composite invalidity determination image in which a prescribed number of the invalidity determination images are composited, and the computing device outputs an invalidity determination signal when a prescribed invalid pixel group size is detected from the composite invalidity determination image.

\* \* \* \* \*